US012769542B2

(12) United States Patent
Liu et al.

(10) Patent No.: US 12,769,542 B2
(45) Date of Patent: Oct. 20, 2026

(54) LIBRARY DEVELOPMENT ENSURING LIBRARY COMPATIBILITY AND MINIMIZING DEPENDENCY CONFLICTS

(71) Applicant: INTERNATIONAL BUSINESS MACHINES CORPORATION, Armonk, NY (US)

(72) Inventors: Xinpeng Liu, Austin, TX (US); Wei Wu, Beijing (CN); Biao Chai, Beijing (CN); Liang Wang, Beijing (CN); Yue Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 18/588,101

(22) Filed: Feb. 27, 2024

(65) Prior Publication Data

US 2025/0272088 A1 Aug. 28, 2025

(51) Int. Cl.
*G06F 8/71* (2018.01)
*G06F 8/41* (2018.01)
*G06F 8/61* (2018.01)

(52) U.S. Cl.
CPC ................ *G06F 8/71* (2013.01); *G06F 8/433* (2013.01); *G06F 8/61* (2013.01)

(58) Field of Classification Search
CPC ............... G06F 8/71; G06F 8/433; G06F 8/61
USPC .......................................................... 717/120
See application file for complete search history.

(56) References Cited

U.S. PATENT DOCUMENTS 8,776,047 B2 * 7/2014 Wookey .................. G06F 8/658 717/169
9,558,017 B2 1/2017 Plate
11,216,302 B2 * 1/2022 Bishop .................. G06F 9/4552
11,789,722 B2 * 10/2023 Samuel ..................... G06F 8/71 717/101

(Continued)

FOREIGN PATENT DOCUMENTS

CN 113778450 A 12/2021
CN 114780109 A 7/2022

(Continued)

OTHER PUBLICATIONS

Foo, Darius, et al. "Efficient static checking of library updates." Proceedings of the 2018 26th ACM Joint Meeting on European Software Engineering Conference and Symposium on the Foundations of Software Engineering. 2018. pp. 791-796 (Year: 2018).*

(Continued)

*Primary Examiner* — Satish Rampuria
(74) *Attorney, Agent, or Firm* — CHIP LAW GROUP

(57) ABSTRACT

An approach is provided for managing library dependencies. Requests to publish multiple libraries to a public library repository are received. The requests include specifications of respective sets of one or more dependencies of the libraries and respective validation scripts. A dependency version tree that includes the specifications of the respective sets of one or more dependencies is built. A request to upload a new version of a library to the public library repository is received. A validation component using the dependency version tree and the validation scripts validates a compatibility between the library and one or more libraries dependent upon the library.

20 Claims, 14 Drawing Sheets

(56) References Cited

U.S. PATENT DOCUMENTS

| | | | | |
|---|---|---|---|---|
| 12,475,230 B2 * | 11/2025 | Seletskiy | G06F 11/3604 | |
| 2008/0244550 A1 * | 10/2008 | Jung | G06F 9/44521 | 717/163 |
| 2015/0268948 A1 * | 9/2015 | Plate | G06F 21/577 | 717/123 |
| 2021/0311926 A1 * | 10/2021 | Ponceleon | G06F 21/12 | |
| 2021/0374558 A1 * | 12/2021 | Tommasi | G06F 16/2228 | |

FOREIGN PATENT DOCUMENTS

| | | |
|---|---|---|
| CN | 115858006 A | 3/2023 |
| CN | 111679852 B | 6/2023 |
| CN | 116820478 A | 9/2023 |

OTHER PUBLICATIONS

Westrip, Simon P. "publCIF: software for editing, validating and formatting crystallographic information files." Applied Crystallography 43.4 (2010): pp. 920-925. (Year: 2010).*

Okur, Semih, and Danny Dig. "How do developers use parallel libraries ?." Proceedings of the ACM SIGSOFT 20th International Symposium on the Foundations of Software Engineering. 2012. pp. 1-11 (Year: 2012).*

Kalra, Sukrit, et al. "POLLUX: safely upgrading dependent application libraries." Proceedings of the 2016 24th ACM SIGSOFT International Symposium on Foundations of Software Engineering. 2016. pp. 290-300. (Year: 2016).*

Dietrich, Jens, et al. "Dependency versioning in the wild." 2019 IEEE/ACM 16th International Conference on Mining Software Repositories (MSR). IEEE, 2019. pp. 349-359. (Year: 2019).*

Pashchenko, Ivan, Duc-Ly Vu, and Fabio Massacci. "A qualitative study of dependency management and its security implications." Proceedings of the 2020 ACM SIGSAC conference on computer and communications security. 2020. pp. 1513-1531. (Year: 2020).*

Wang et al., Watchman: Monitoring Dependency Conflicts for Python Library Ecosystem, IEEE/ACM 42nd International Conference on Software Engineering (ICSE) Published Dated: Oct. 5, 2020, Retrieved from Internet: https://ieeexplore.ieee.org/document/9284138, 11 pages.

* cited by examiner

LIBRARY DEVELOPMENT ENSURING LIBRARY COMPATIBILITY AND MINIMIZING DEPENDENCY CONFLICTS

BACKGROUND

The present invention relates to software development, and more particularly to software library development.

SUMMARY

In one embodiment, the present invention provides a computer-implemented method. The method includes receiving, by a processor set, requests to publish multiple libraries to a public library repository. The requests include specifications of respective sets of one or more dependencies of the multiple libraries and respective validation scripts. The method further includes building, by the processor set, a dependency version tree that includes the specifications of the respective sets of one or more dependencies. The method further includes receiving, by the processor set, a request to upload a new version of a library to the public library repository. The library is included in the multiple libraries. The method further includes validating, by a validation component and using the dependency version tree and the validation scripts, a compatibility between the library and one or more libraries dependent upon the library.

A computer system and a computer program product corresponding to the above-summarized computer-implemented method are also described herein.

DETAILED DESCRIPTION

Overview

Figure 1:
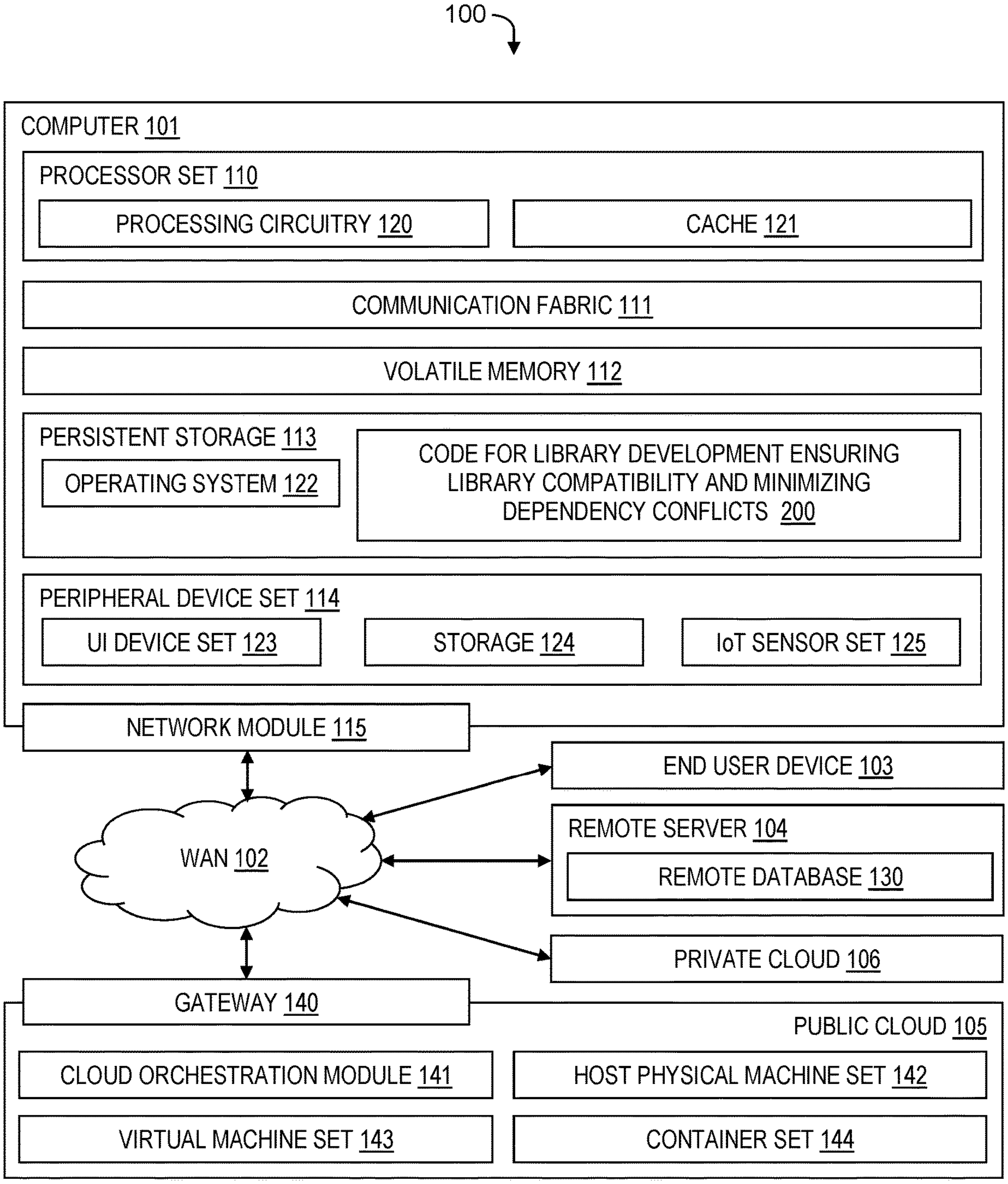
FIG. 1 is a block diagram of a system for library development ensuring library compatibility and minimizing dependency conflicts, in accordance with embodiments of the present invention.

For a software development project, a developer often installs multiple libraries and manages the dependencies between libraries. The installation of the libraries can lead to dependency conflicts, where multiple libraries require different versions of the same library or where two libraries have dependencies on a third library that is not compatible with both of the two libraries. Dependency conflicts cause a range of issues, such as errors and crashes, making it difficult to develop and maintain projects. Resolving these conflicts requires significant time and effort, as a developer may need to manually adjust dependencies and versioning to ensure compatibility. Despite the use of conventional approaches to avoid dependency conflicts in actual development, the known management of dependencies in development is a complex task.

Under conventional approaches for managing dependencies, different projects may use inconsistent ways to declare dependencies, such as using setup.py or pyproject.toml, which lead to a lack of strong constraints on the referencing of the dependencies in a project's specific build environment. This lack of strong constraints results in unpredictable errors that are resolved only through manual debugging. Besides the inconsistency of dependency declaration file formats, for each dependency statement within the file, both a specific version and a version ranged specification are used, which leads to future conflicts when a new library version is published.

As one example of the aforementioned incompatibility issue arising under conventional approaches, a project is using two libraries, Library_A and Deps_1, both of which depend on library Deps_2. The latest version of Deps_2 is Deps_2_1. Under version Deps_2_1, both Library_A and Deps_1 run successfully and without any conflicts. Subsequently, a problem arises and the project stops working. After spending a significant amount of time and effort in researching the problem and manually debugging, it is discovered that Deps_2 had released a new version, Deps_2_2, and both Library_A and Deps_1 had automatically installed the new version, Deps_2_2. Deps_1, however, supports Deps_2_1, but not Deps_2_2, thereby causing conflicts and errors in the project.

Embodiments of the present invention address the aforementioned unique challenges by providing an approach that establishes a set of guidelines for library developers to follow so that dependency conflicts are prevented in the future. Embodiments of the present invention provide a standardized approach to library development that ensures compatibility with other libraries and minimizes the likelihood of dependency conflicts.

Embodiments of the present invention define a dependency version tree, which requires a library developer to submit a version range of all dependencies when publishing a new version of a library to a public library repository, such as Python® Package Index (PyPI®). Python and PyPI are registered trademarks of Python Software Foundation located in Beaverton, Oregon. Embodiments of the present invention provide novel features discussed herein that are language-neutral and are not limited to the Python® language. The requirement to submit the version range of all the dependencies when publishing a new library version provides a clear understanding of the dependencies required by each library, and how the dependencies may conflict with other dependencies in a given project.

Embodiments of the present invention provide a validation component that requires a library developer to provide a custom validation script as part of the developer's library. When a developer updates the developer's library, the validation component automatically uses the maintained dependency version tree to find all libraries that depend on the updated library and invokes the validation script of the developer's library to verify library compatibility. If the validation is successful, the dependency version tree is updated and the validation recursively proceeds to verify the compatibility of the dependencies of one or more other libraries in the direction of the root node of the dependency version tree. The validation component ensures that libraries are properly validated and reduces the likelihood of errors and conflicts caused by inconsistent dependency versions.

The standardized approach to managing dependencies and ensuring compatibility disclosed herein reduces the occurrence of dependency conflicts in software development, thereby making it easier for developers to create high-quality software and maintain their software development projects over time.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for library development ensuring library compatibility and minimizing dependency conflicts, in accordance with embodiments of the present invention. Computing environment 100 contains an example of an environment for the execution of at least some of the computer code involved in performing the inventive methods, such as code 200 for library development ensuring library compatibility and minimizing dependency conflicts. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
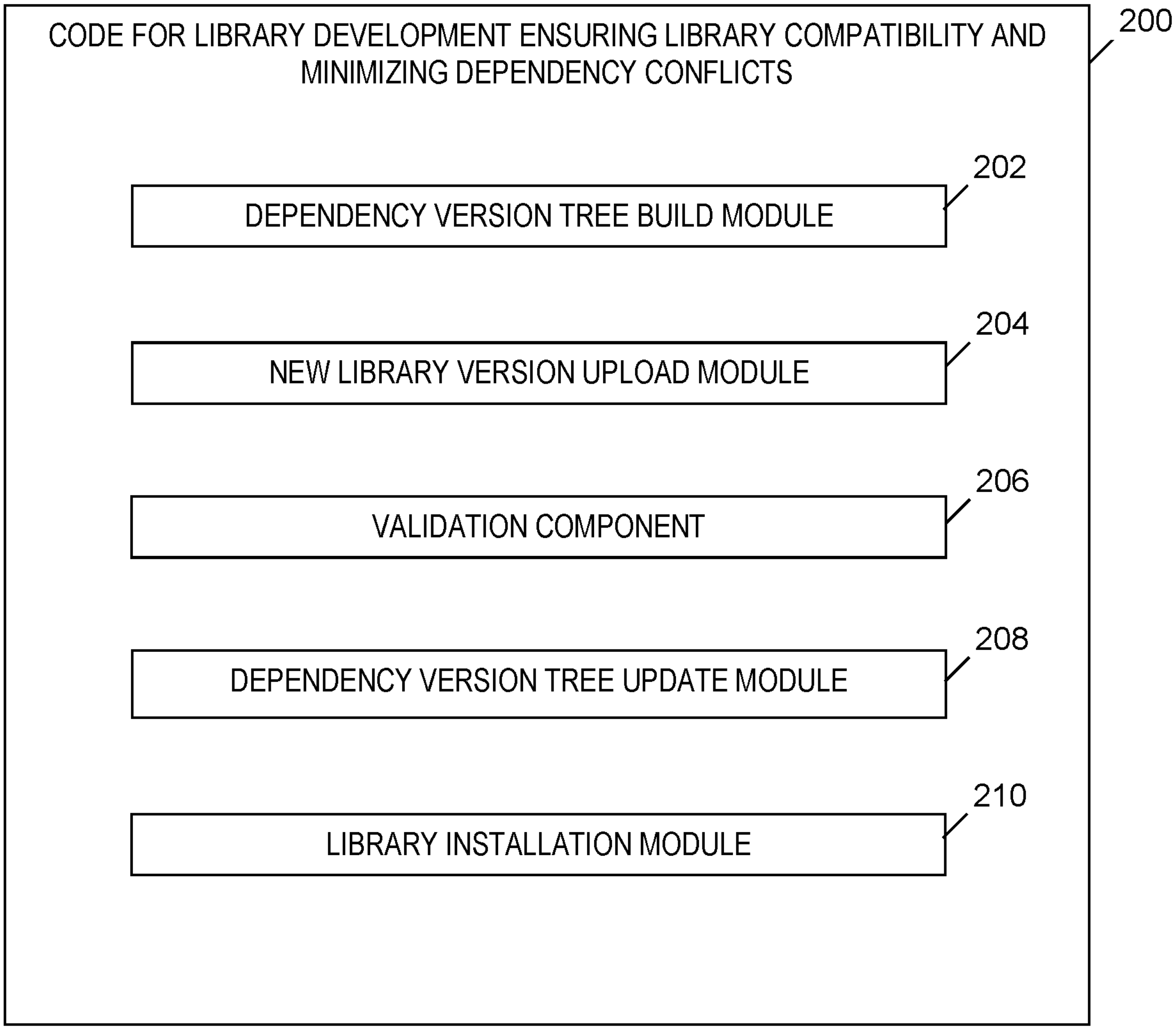
FIG. 2 is a block diagram of modules included in code included in the system of FIG. 1, in accordance with embodiments of the present invention.

System and Process for Library Development Ensuring Library Compatibility and Minimizing Dependency Conflicts FIG. 2 is a block diagram of modules included in code 200 included in system 100 of FIG. 1, in accordance with embodiments of the present invention. Code 200 includes a dependency version tree build module 202, a new library version upload module 204, a validation component 206, a dependency version tree update module 208, and a library installation module 210.

Dependency version tree build module 202 is configured to build a dependency version tree that includes specifications of multiple libraries and sets of one or more dependencies of the multiple libraries. Dependency version tree build module 202 is further configured to receive requests to publish the aforementioned multiple libraries to a public library repository (e.g., PyPI®). A received request to publish a library includes a submission by a library developer of a version range of all of the one or more dependencies of the library. As used herein, a dependency of a given library is a library that depends on the given library. The received request to publish a library also includes a customized validation script as part of the library. The customized validation script verifies a compatibility between the library being published and the library's dependencies.

New library version upload module 204 is configured to receive a request to upload a new version of a library to the public library repository. New library version upload module 204 is further configured to upload the new version of the library to the public library repository.

Validation component 206 is configured to identify all of the one or more libraries dependent upon an uploaded library or an uploaded new version of a library and to verify whether or not there is compatibility between the uploaded library or new version of the library and each of the identified one or more libraries dependent upon the uploaded library or new version of the library. In one embodiment, validation component 206 is further configured to detect the upload of a new version of the library performed by the new library version upload module 204 and to be triggered in response to detecting the aforementioned upload of the new version.

Dependency version tree update module 208 is configured to update the dependency version tree in response to the verification by the validation component 206 being successful. The update of the dependency version tree includes adding the new version of the library in an extended range of versions to which a given library is mapped, where the given library is selected from the identified one or more libraries dependent upon the uploaded new version of the library, and where the selection of the given library is performed by validation component 206.

Library installation module 210 is configured to (i) receive a request to install a library dependent upon another library (e.g., the new version of the library uploaded by the new library version upload module 204); (ii) download the requested library from the public library repository; (iii) install the library whose installation was requested; and (iv) use the installed library with an assurance of compatibility between the installed library and one or more dependent libraries and with a minimized likelihood of dependency conflicts.

The functionality of the modules included in code 200 is described in more detail in the discussions presented below relative to FIGS. 3A-3B, FIG. 3C, FIGS. 4A-4B, FIGS. 5A-5E, FIG. 6, and FIG. 7.

Figure 3A:
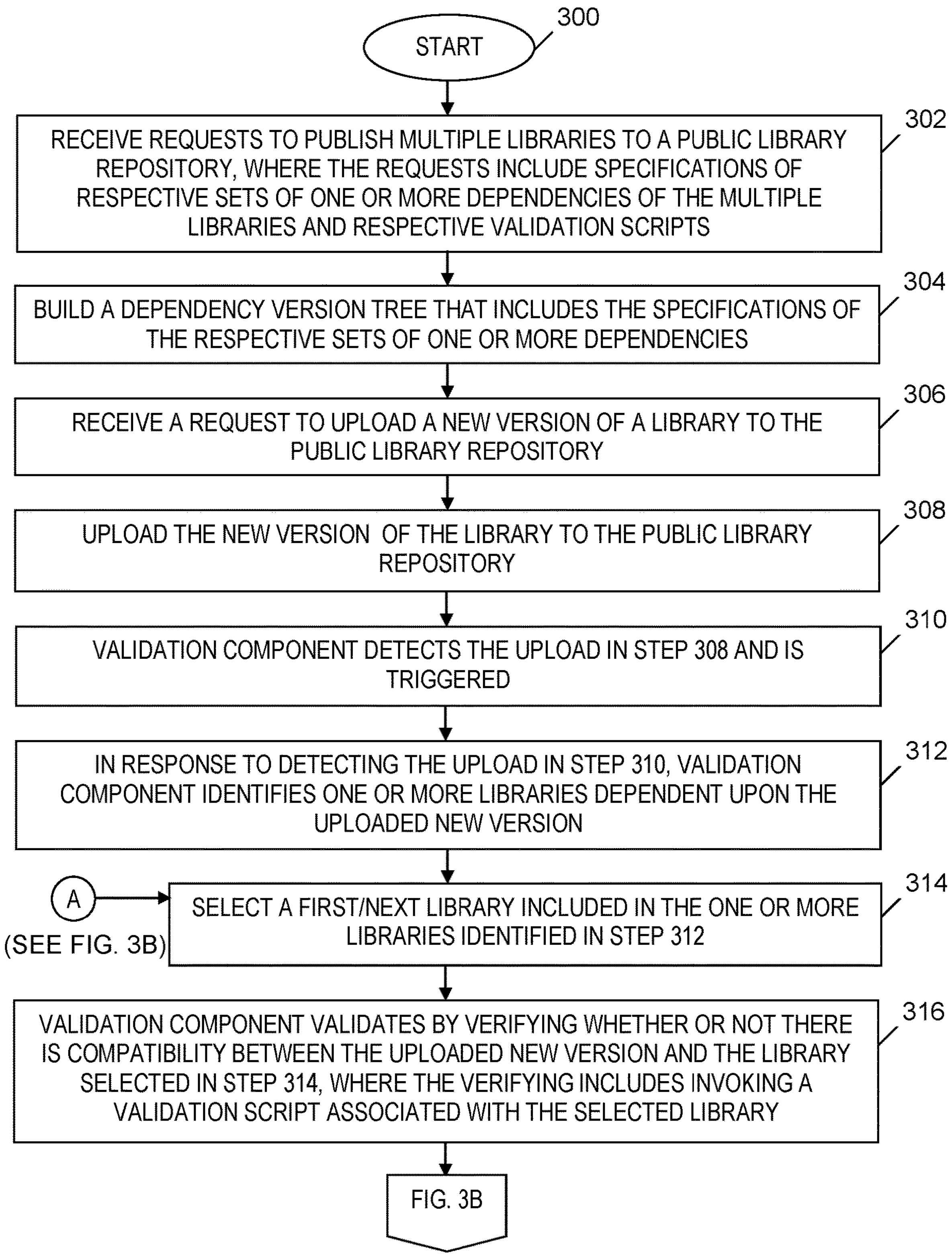
FIGS. 3A-3B depict a flowchart of a process of library development ensuring library compatibility and minimizing dependency conflicts, where operations of the flowchart are performed by modules in FIG. 2, in accordance with embodiments of the present invention.
Figure 3B:
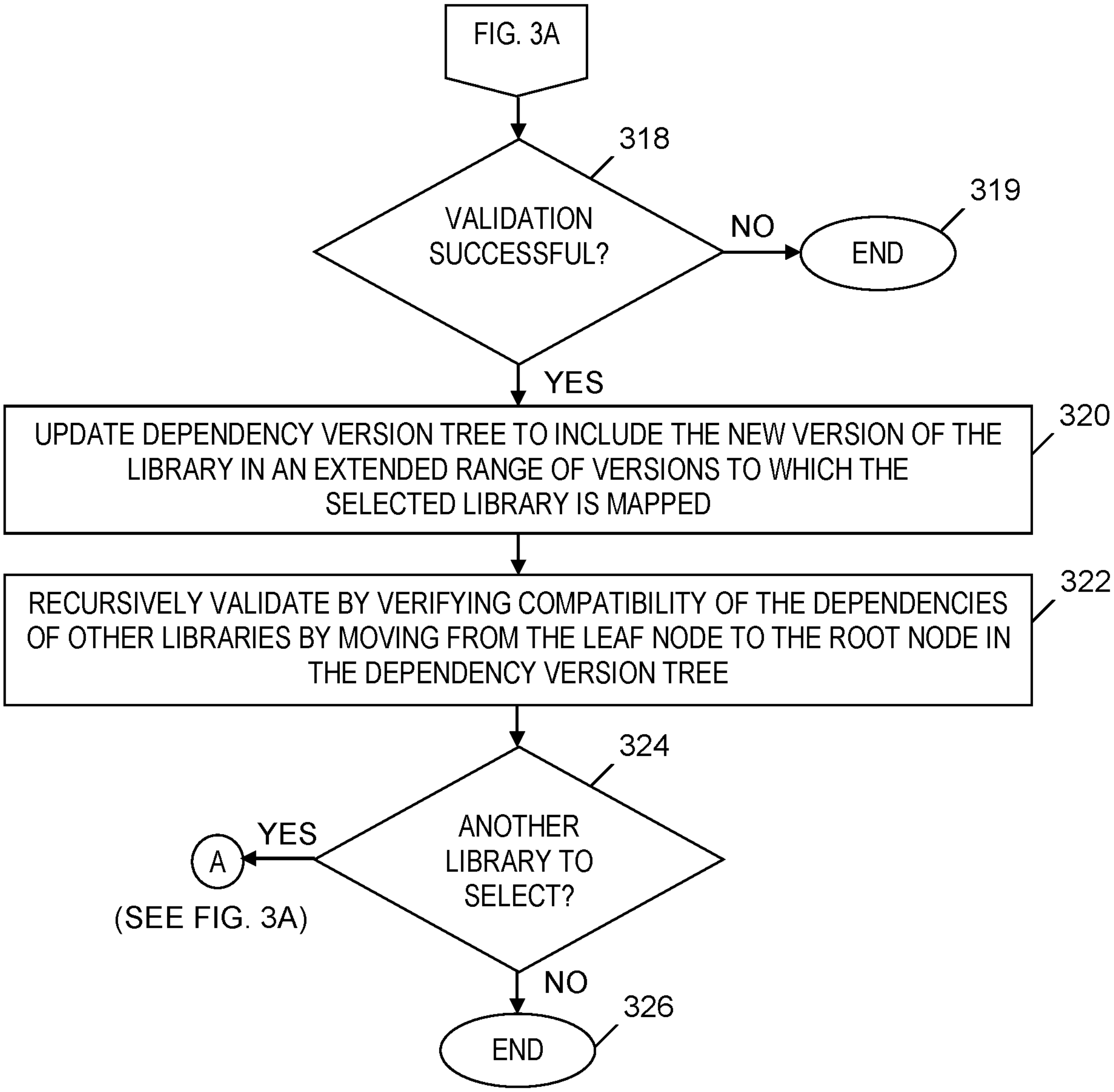

FIGS. 3A-3B depict a flowchart of a process of library development ensuring library compatibility and minimizing dependency conflicts, where operations of the flowchart are performed by modules in FIG. 2, in accordance with embodiments of the present invention. The process of FIGS. 3A-3B begins at a start node 300. In step 302, dependency version tree build module 202 receives requests to publish multiple libraries to a public library repository. The requests to publish include (i) specifications of respective sets of one or more dependencies of the multiple libraries and (ii) respective validation scripts. In one embodiment, a request to publish a library includes the library being published, along with (i) a declaration of all of the one or more dependencies of the library in a tree format, which indicates a version or a specified range of versions for each dependency and (ii) a custom script (also referred to herein as a validation script or a customized validation script) that validates the compatibility between the library being published and the library's one or more dependencies.

The submission of the range of versions when publishing a new version of a given library provides a clear understanding of the dependencies required by the given library and how a dependency may conflict with other dependencies in a given software development project.

In step 304, dependency version tree build module 202 builds a dependency version tree that includes the specifications of the respective sets of the one or more dependencies of the multiple libraries.

In step 306, new library version upload module 204 receives a request to upload a new version of a library to the public library repository. The library whose new version's upload is being requested is a library included in the aforementioned multiple libraries which were published in the public library repository in response to the requests received in step 302.

In step 308, new library version upload module 204 uploads the new version of the library to the public library repository.

In step 310, validation component 206 detects the upload in step 308 and is triggered.

In step 312, in response to detecting the upload in step 310, validation component 206 identifies one or more libraries dependent upon the new version of the library uploaded in step 308. The identification of the one or more libraries in step 312 utilizes the dependency version tree.

In step 314, validation component 206 selects a first library included in the one or more libraries identified in step 312. Alternatively, if step 314 is being repeated in a loop described below, then validation component 206 selects a next library included in the one or more libraries identified in step 312. Hereinafter, in the discussion of FIGS. 3A-3B, the first library or next library selected in the most recent performance of step 314 is referred to as the "selected library."

In step 316, validation component 206 validates the selected library by verifying whether or not there is compatibility between the uploaded new version of the library and the selected library, where the verifying includes invoking a validation script associated with the selected library. The invoked validation script is included in the validation scripts that are included in the requests to publish discussed above relative to step 302. In one embodiment, the validation in step 316 is performed in response to the detection of the upload of the new version of the library in step 310.

Following step 314, the process of FIGS. 3A-3B continues with step 318 in FIG. 3B.

In step 318, validation component 206 determines whether the validation of the selected library is successful (i.e., determines whether the compatibility between the uploaded new version of the library and the selected library is verified). If validation component 206 determines in step 318 that the validation of the selected library is not successful, then the No branch of step 318 is followed, and the process of FIGS. 3A-3B ends at an end node 319. Returning to step 318, if validation component 206 determines that the validation of the selected library is successful, then the Yes branch of step 318 is followed and step 320 is performed.

In step 320, dependency version tree update module 208 updates the dependency version tree by adding the new version of the library in an extended range of versions to which the selected library is mapped.

In step 322, validation component 206 recursively validates the dependencies of other libraries starting with a validation of all of the one or more libraries that depend on the selected library, which includes identifying the one or more libraries that depend on the selected library and then repeating the validation, the determination of a successful validation, and the updating of the dependency version tree in steps 316, 318, and 320. The recursively validating in step 322 includes traversing a path in the dependency version tree by moving from a node of the dependency version tree associated with the selected library towards a root node of the dependency version tree. The aforementioned validation and recursive validation ensure that libraries are properly validated and reduces the likelihood of errors and conflicts caused by inconsistent dependency versions.

In step 324, validation component 206 determines whether there is another library to select from the one or more libraries identified in step 312. If validation component 206 determines in step 324 that there is another library (i.e., a next library) to select from the one or more libraries identified in step 312, then the Yes branch of step 324 is followed, and the process of FIGS. 3A-3B loops back to step 314 in FIG. 3A, which selects the next library.

Returning to step 324, if validation component 206 determines that there is not another library (i.e., there is not a next library) to select from the one or more libraries identified in step 312, then the No branch of step 324 is followed and the process of FIGS. 3A-3B ends at an end node 326.

Figure 3C:
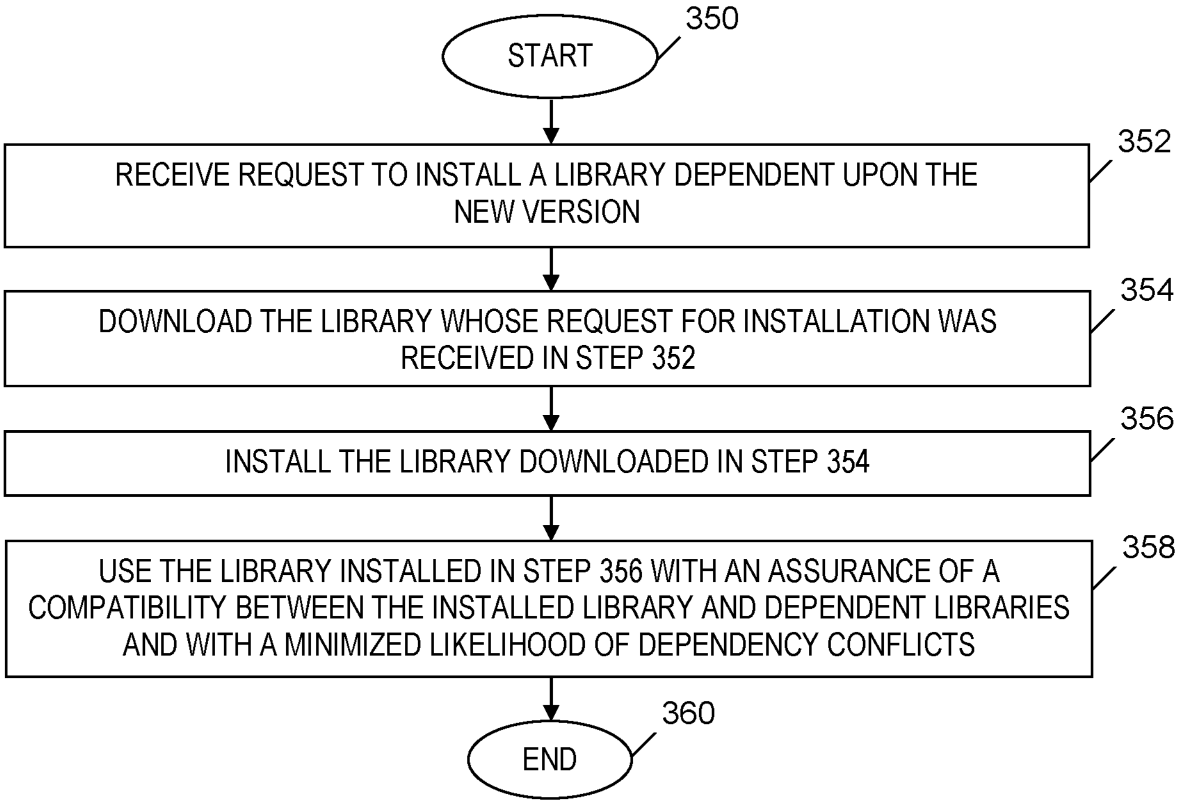
FIG. 3C is a flowchart of a process of installing a library in a local development environment, where the installation is performed by a module in FIG. 2, in accordance with embodiments of the present invention.

FIG. 3C is a flowchart of a process of installing a library in a local development environment, where the installation is performed by a module in FIG. 2, in accordance with embodiments of the present invention. The process of FIG. 3C begins at a start node 350. In step 352, library installation module 210 receives a request from a user to install a library that is dependent upon the new version of the library that was uploaded in step 308 in FIG. 3A. The request to install the library is received via a computer system utilized by the user.

In step 354, library installation module 210 downloads the library whose request for installation was received in step 352. The aforementioned library is downloaded in step 354 from the public library repository. Also in step 354, library installation module 210 downloads the dependency version tree from the public library repository.

In step 356 and based on the downloaded dependency version tree, library installation module 210 installs one or more dependent libraries that are dependent upon the library downloaded in step 354, and subsequently installs the library downloaded in step 354. Step 356 includes installing the one or more dependent libraries and the library downloaded in step 354 onto the computer system utilized by the user.

In step 358, the computer system utilized by the user uses the library installed in step 356 in software development action(s), where the use of the library is performed with an assurance of a compatibility of the installed library with any of the one or more dependent libraries and with a minimized likelihood of a conflict between the installed library and any one of the one or more dependent libraries.

Following step 358, the process of FIG. 3C ends at an end node 360.

Figure 4A:
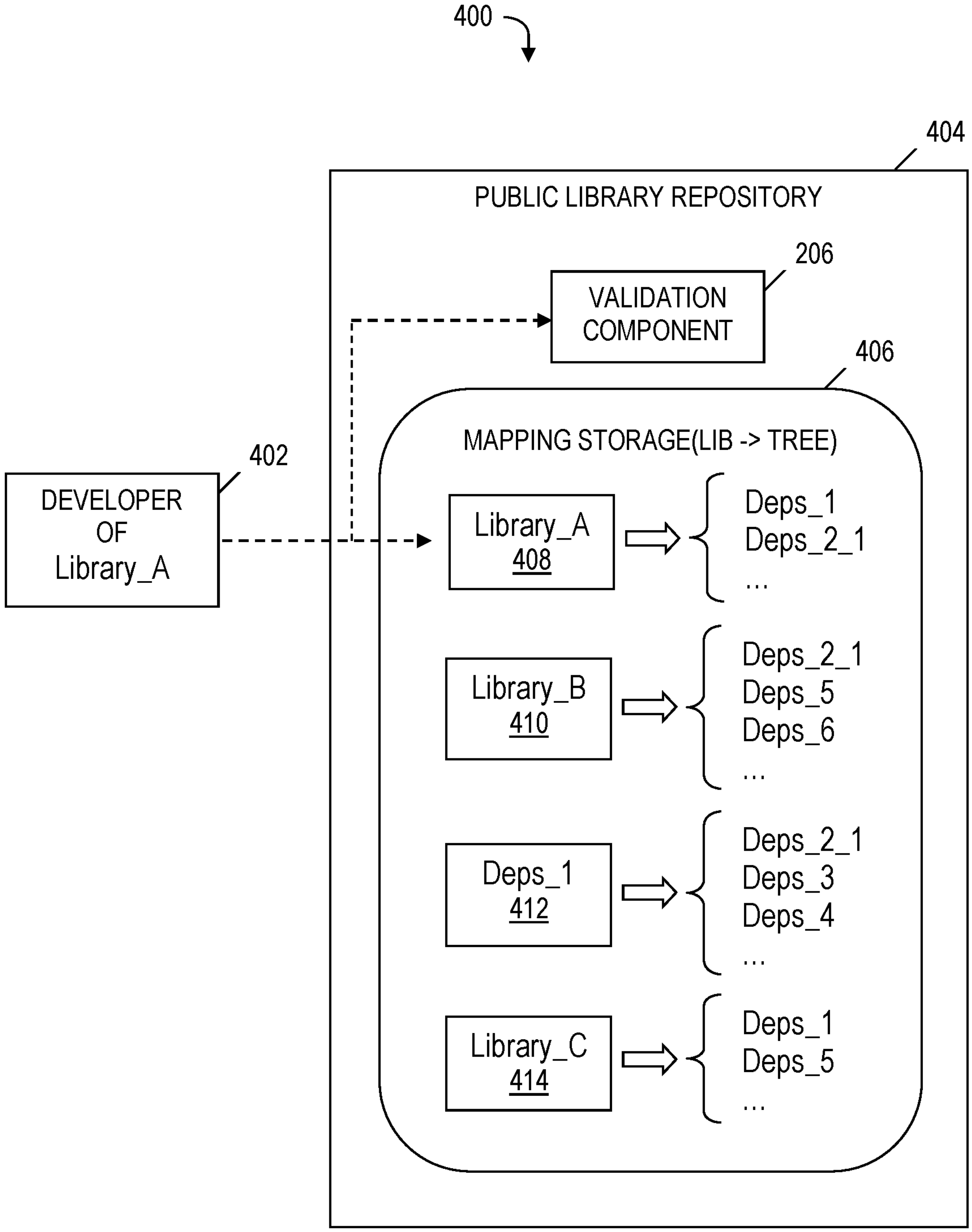
FIGS. 4A-4B depict an example of uploading a library and building a dependency version tree in the process of FIGS. 3A-3B, in accordance with embodiments of the present invention.
Figure 4B:
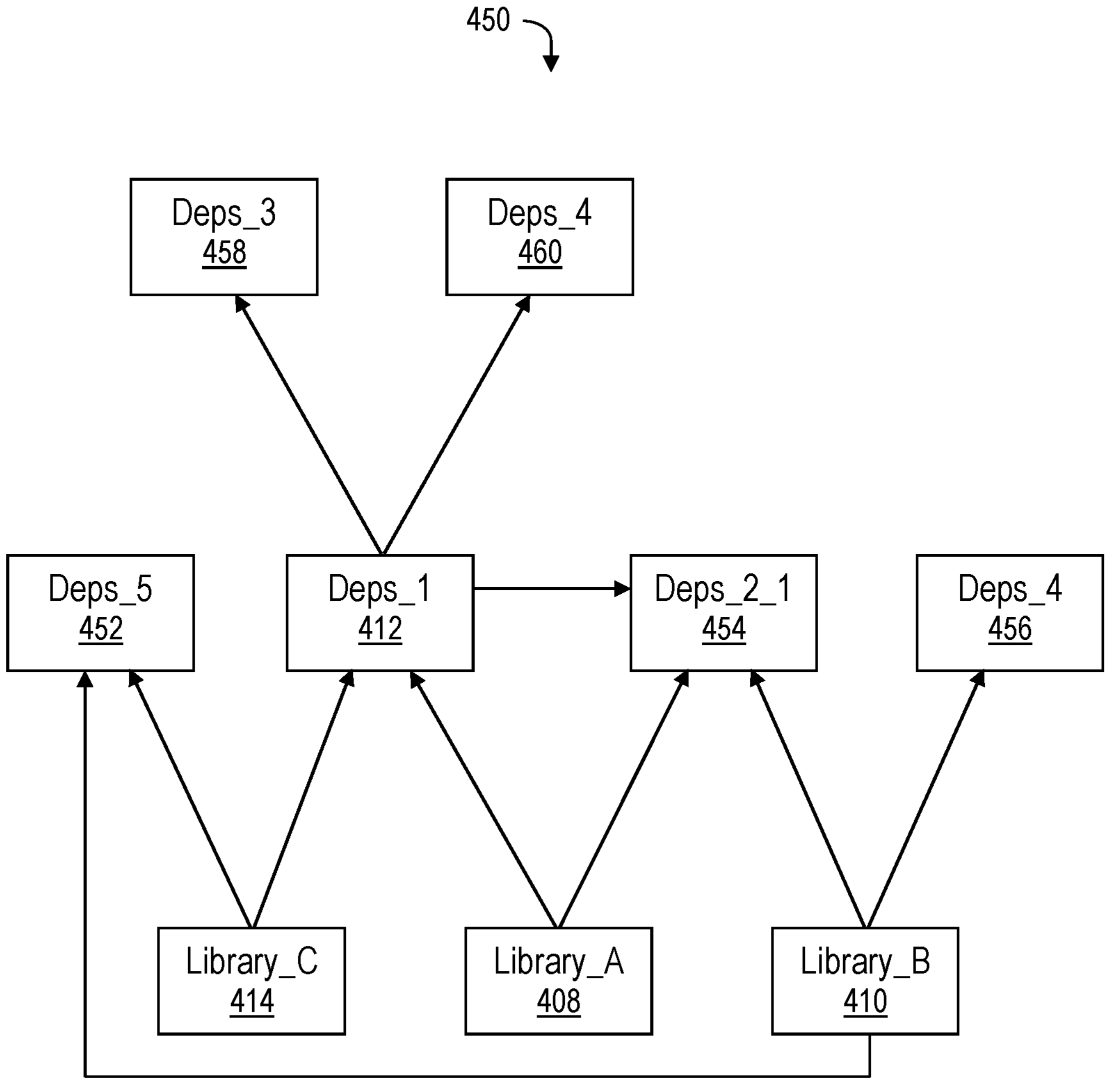

FIGS. 4A-4B depict an example of uploading a library and building a dependency version tree in the process of FIGS. 3A-3B, in accordance with embodiments of the present invention. Example 400 in FIG. 4A includes a developer 402 of Library_A and a public library repository 404, which includes a mapping storage 406 and validation component 206. Developer 402 of Library_A submits a new library (i.e., Library_A) and a validation script, where the new library is added to public library repository 404, and the validation script is stored in validation component 206. The submitted validation script is a customized script that validates Library_A by verifying a compatibility between Library_A and another library on which Library_A depends. Mapping storage 406 includes mappings of (i) Library_A to dependencies that include Deps_1 and Deps_2_1; (ii) Library_B to dependencies that include Deps_2_1, Deps_5, and Deps_6; (iii) Deps_1 to dependencies that include Deps_2_1, Deps_3, and Deps_4; and (iv) Library_C to dependencies that include Deps_1 and Deps_5.

Dependency version tree build module 202 builds a dependency version tree 450 in FIG. 4B from the information in mapping storage 406 in FIG. 4A. Dependency version tree 450 is maintained by public library repository 404 rather than in the project of developer 402 of Library_A (or any other developer). Dependency version tree 450 specifies, for example, that Library_A is dependent on Deps_1 and Deps_2_1, and that Deps_1 is dependent on Deps_3, Deps_4, and Deps_2_1.

FIGS. 5A-5E depict an example 500 of uploading a new version of a library and validating library compatibility by using a validation component and a dependency version tree in the process of FIGS. 3A-3B, in accordance with embodiments of the present invention. Example 500 includes a developer 502 of Deps_2 and a public library repository 504, which includes a validation component 506 and a mapping storage 508. Public library repository 504 is an example of public library repository 404, validation component is an example of validation component 206, and mapping storage 508 is an example of mapping storage 406.

Figure 5A:
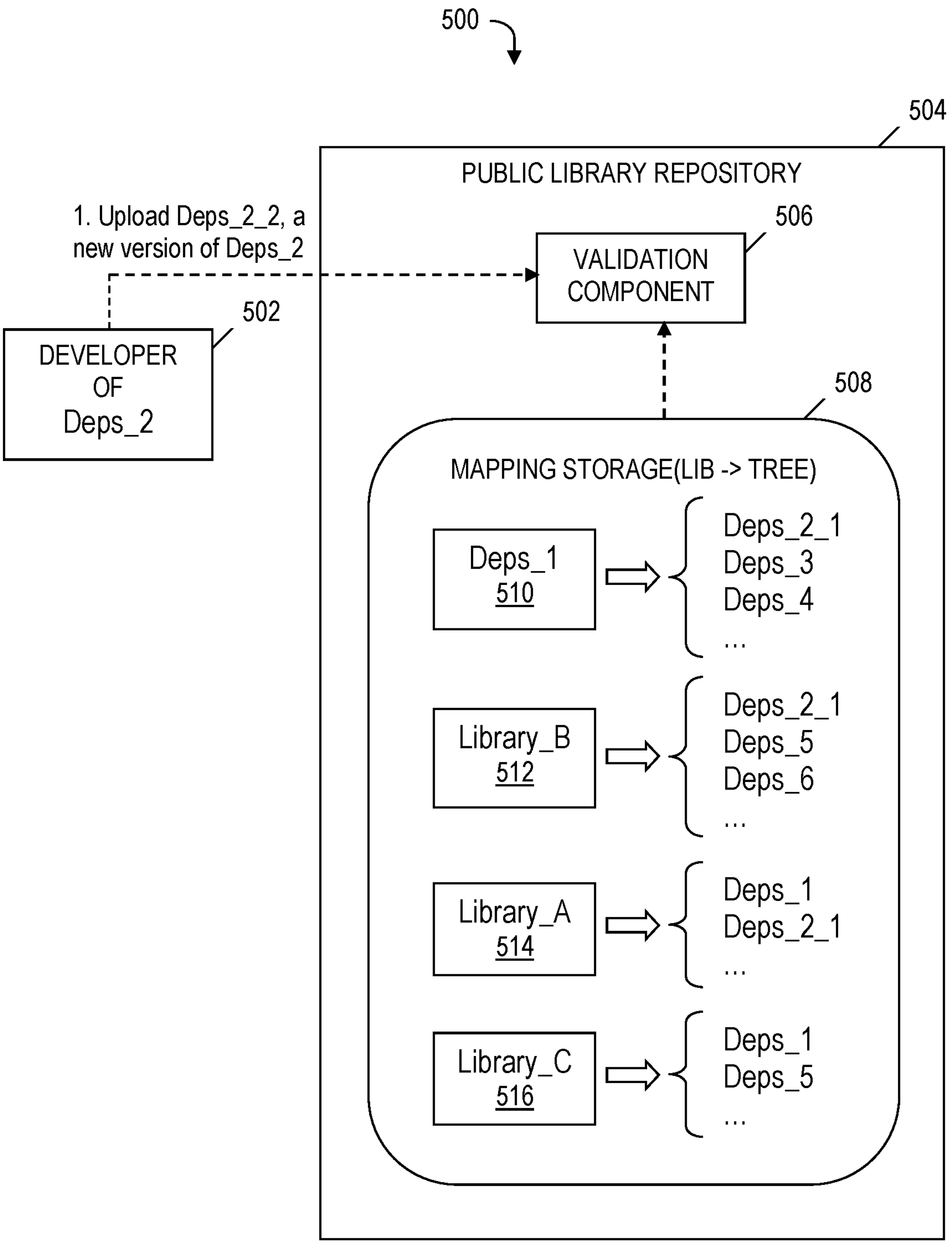
FIGS. 5A-5E depict an example of uploading a new version of a library and validating library compatibility by using a validation component and a dependency version tree in the process of FIGS. 3A-3B, in accordance with embodiments of the present invention.

In FIG. 5A, example 500 includes a step 1, which includes developer 502 of Deps_2 uploading a new version of the library Deps_2 to public library repository 504, where the old version of Deps_2 is Deps_2_1 and the new version of Deps_2 is Deps_2_2. The uploading of the new version, Deps_2_2, is an example of step 308 in FIG. 3A. Validation component 506 detects the upload of Deps_2_2 and is triggered.

Figure 5B:
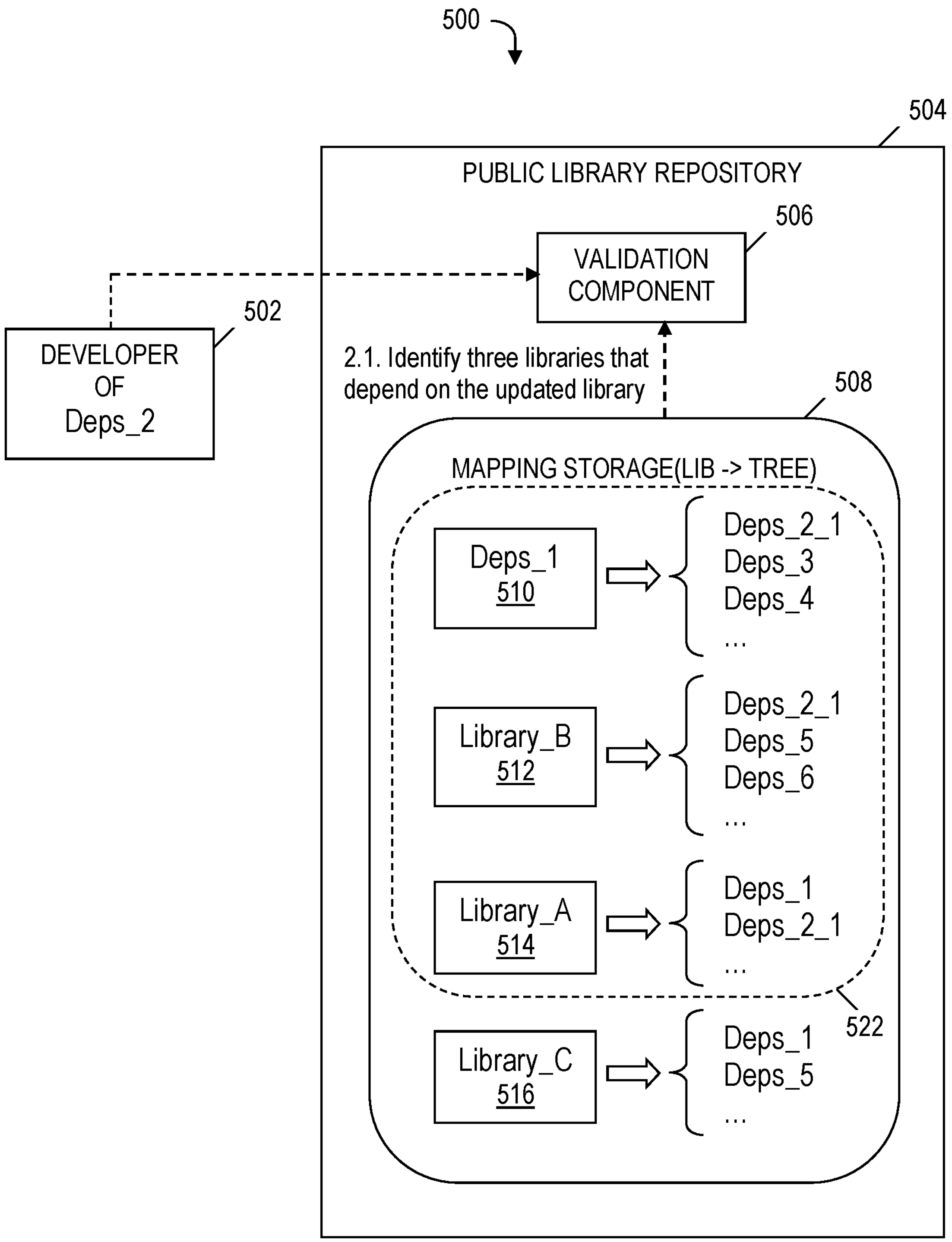

In FIG. 5B, example 500 includes a step 2.1, which includes validation component 506 identifying three libraries 522 (i.e., Deps_1, Library_B, and Library_A) that depend on the library being updated (i.e., Deps_2). Validation component 506 identifies Deps_1, Library_B, and Library_A as all the libraries that depend on Deps_2_1, which is the old version of Deps_2. The identification of the three libraries is an example of step 312 in FIG. 3A.

Figure 5C:
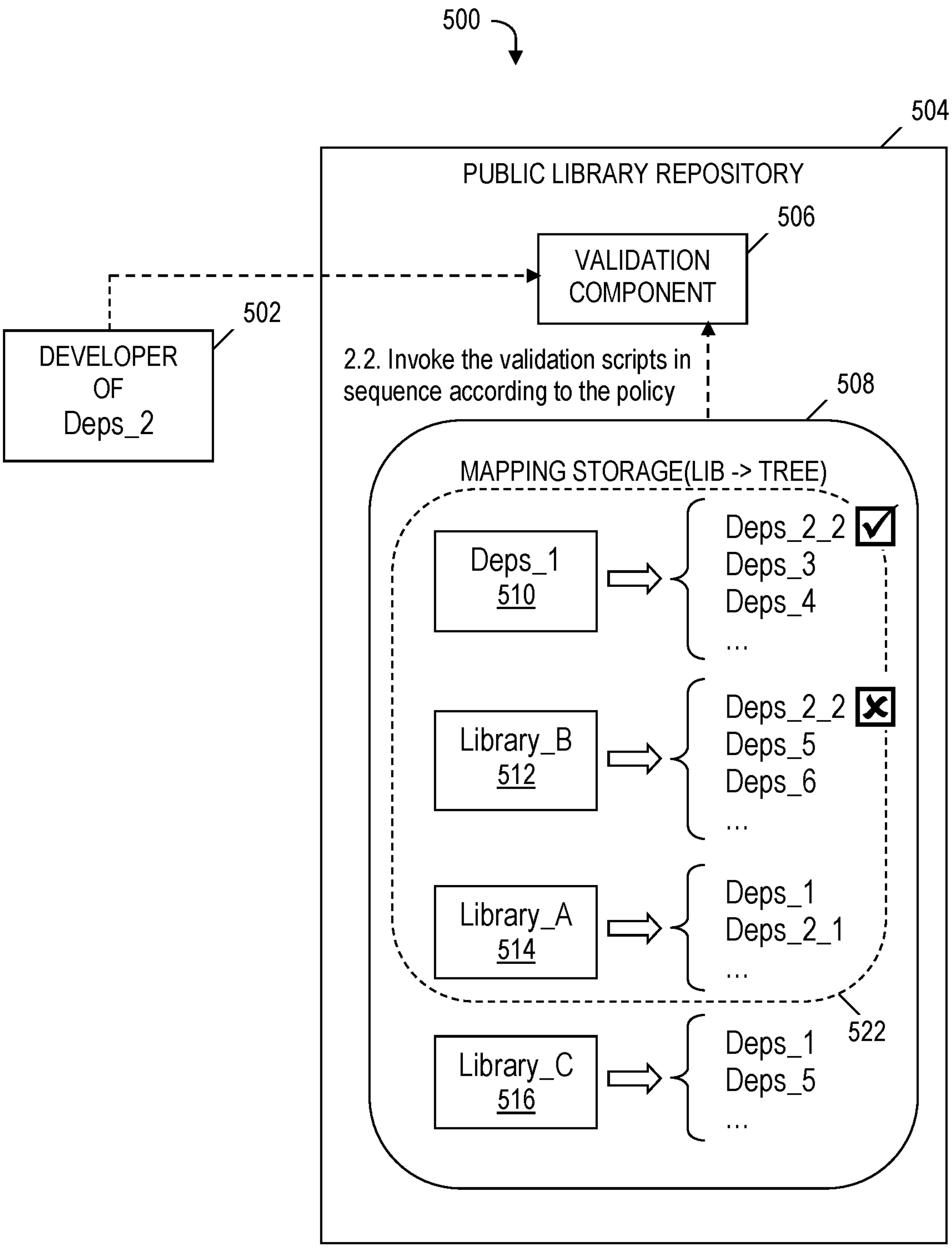

In FIG. 5C, example 500 includes a step 2.2, which includes validation component 506 invoking the validation scripts of the three libraries 522, which were identified in step 2.1 in FIG. 5B to verify compatibility between Deps_2_2 (i.e., the uploaded new version of library Deps_2) and each of the identified three libraries 522 (i.e., Deps_1, Library_B, and Library_A). Step 2.2 is an example of step 316 in FIG. 3A. The validation scripts are invoked in a sequence according to a specified policy. The invocation of the validation scripts is an example of step 316 in FIG. 3A.

The checkmark in FIG. 5C indicates that running the validation script associated with Deps_1 verifies that Deps_2_2 is compatible with Deps_1, which is an example of following the Yes branch of step 318 in FIG. 3B. The checkmark further indicates that Deps_2_2 will be added to an extended range of versions to which Deps_1 is mapped. The "x" in the box in FIG. 5C indicates that running the validation script associated with Library_B determines that Deps_2_2 is not compatible with Library_B, which is an example of following the No branch of step 318 in FIG. 3B. The "x" in the box further indicates that there will be no change to the range of versions to which Library_B is mapped.

Figure 5D:
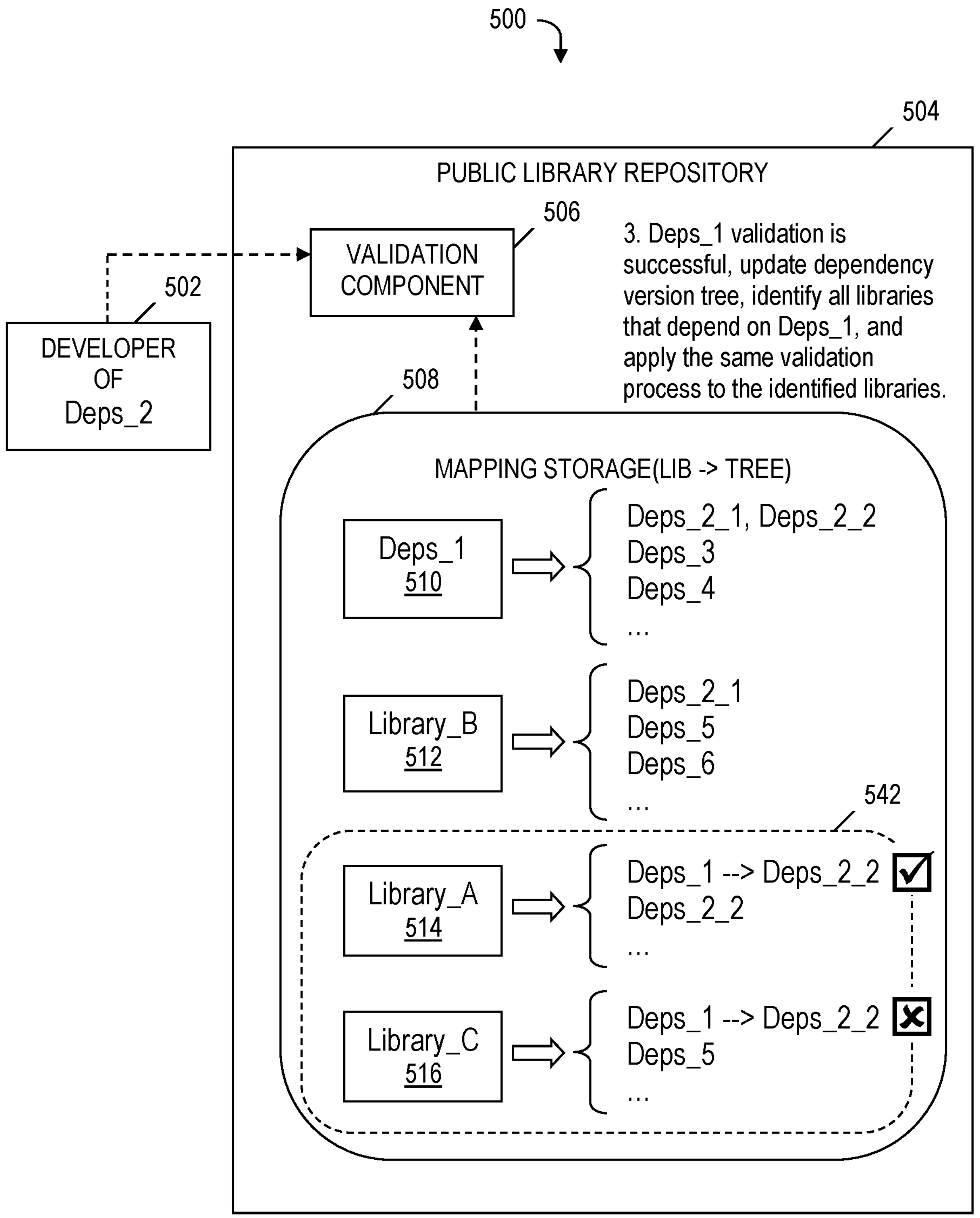

In FIG. 5D, example 500 includes a step 3, which includes validation component 506 determining whether the validation of Deps_1 is successful and if the validation is successful, step 3 further includes dependency version tree update module 208 updating the dependency version tree to include Deps_2_2. Step 3 further includes validation component 506 recursively proceeding to verify the compatibility of other libraries according to a direction toward the root node of the dependency version tree. More specifically, step 3 includes validation component 506 determining that the validation of Deps_1 is successful, and dependency version tree update module 208 updating the dependency version tree to include Deps_2_2 in an extended range of versions to which Deps_1 is mapped. This extended range of versions includes both Deps_2_1 and Deps_2_2, and is illustrated in the mapping of Deps_1 in mapping storage 508 in FIG. 5D. Step 3 is an example of steps 318 and 320 in FIG. 3B.

Following the update of the dependency version tree, step 3 in FIG. 5D also includes validation component 506 identifying a set of libraries 542, which are all the libraries that depend on Deps_1 (i.e., identifying Library_A and Library_C) and applying the validation process to all the identified libraries that depend on Deps_1, where the validation process is the same as the validation process that was applied to Deps_1. The validation process applied to Library_A includes verifying compatibility between Deps_2_2 and Library_A and results in a successful validation, as indicated by the checkmark. The validation process applied to Library_C includes verifying compatibility between Deps_2_2 and Library_C and results in an unsuccessful validation, as indicated by the "x" in the box.

Figure 5E:
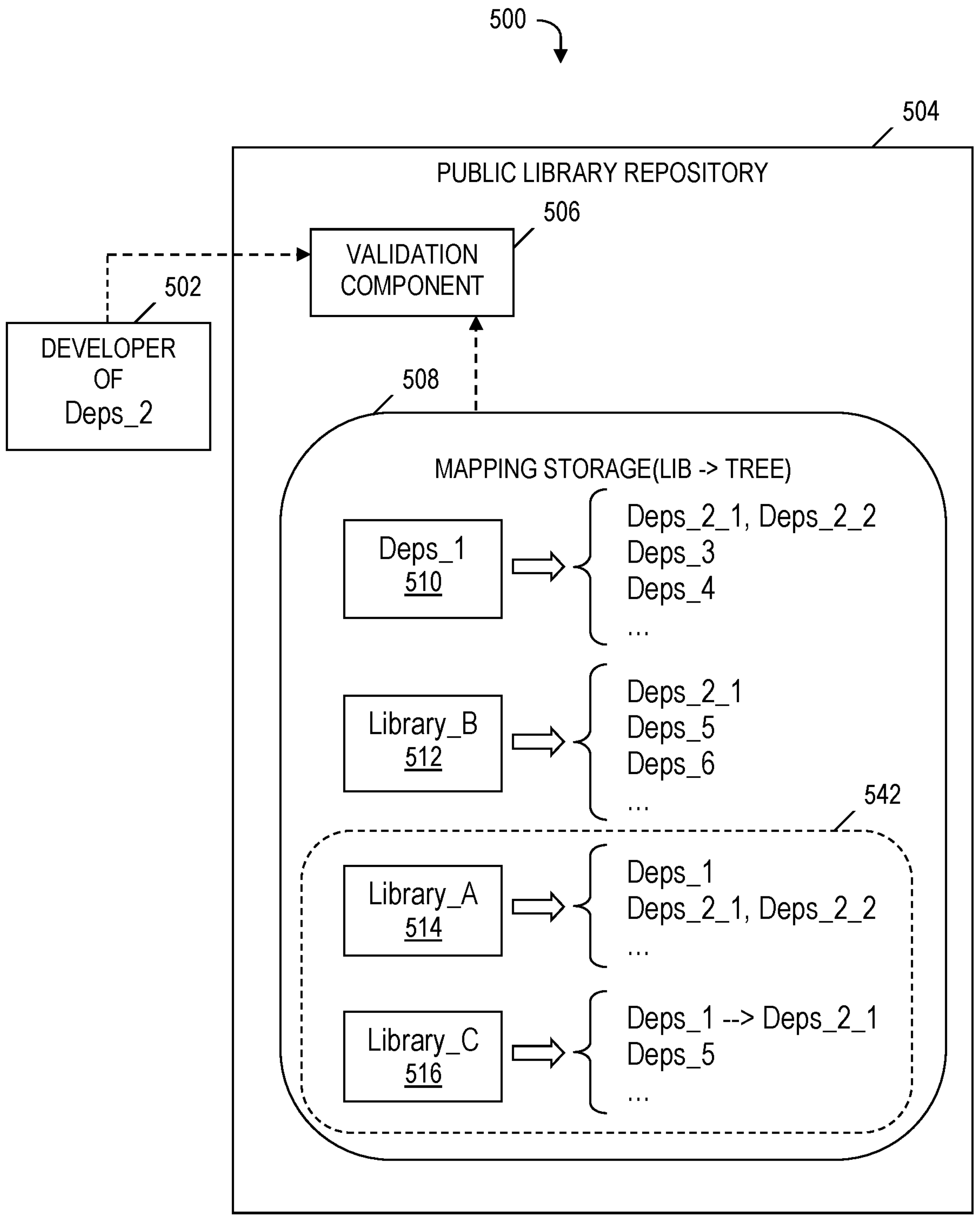

In FIG. 5E, Library_A in set of libraries 542 that depend on Deps_1 is mapped to an extended range of versions that includes both Deps_2_1 and Deps_2_2, which is a result of the successful validation discussed above relative to FIG. 5D. Library_C in set of libraries 542 retains an original mapping to Deps_2_1 and does not have a mapping to Deps_2_2, which is a result of the unsuccessful validation discussed above relative to FIG. 5D. FIG. 5E illustrates a result of step 322 in FIG. 3B.

Figure 6:
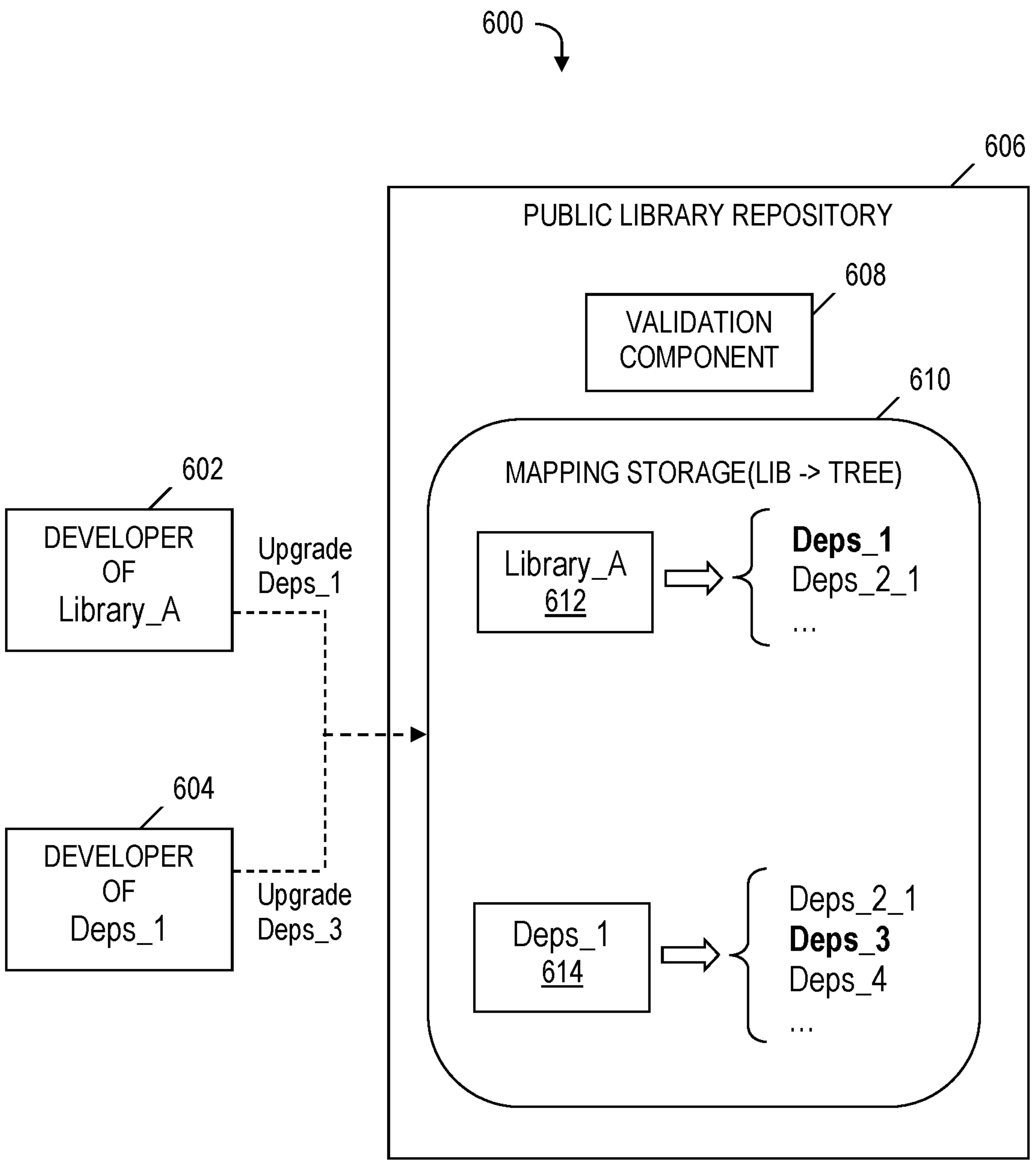
FIG. 6 is an example of queueing different updates of library dependencies based on respective positions in the dependency version tree, in accordance with embodiments of the present invention.

FIG. 6 is an example 600 of queueing different updates of library dependencies based on respective positions in the dependency version tree, in accordance with embodiments of the present invention. Example 600 includes a developer 602 of Library_A, a developer 604 of Deps_1, a public library repository 606, a validation component 608, and a mapping storage 610. Public library repository 606 is an example of public library repository 404, validation component 608 is an example of validation component 206, and mapping storage 610 is an example of mapping storage 406. Mapping storage includes a mapping of library 612 (i.e., Library_A) to Deps_1 and Deps_2_1 and a mapping of library 614 (i.e., Deps_1) to Deps_2_1, Deps_3, and Deps_4.

Example 600 illustrates a case in which developer 602 of Library_A and developer 604 of Deps_1 submit new library versions at the same time or nearly at the same time. That is, developer 602 submits an upgrade of Deps_1 and developer 604 submits an upgrade of 604. Because the dependency version tree needs to be made consistent, parallel processing of the two upgrades is not allowed. Instead, a prioritization policy is employed to queue the upgrades in a particular sequence. In this case, the processing of the upgrade of the dependency of Library_A is queued to wait behind the processing of the upgrade of the dependency of Deps_1. Thus, the processing for Library_A begins only after the validation for Deps_1 has been completed in steps 316, 318, 320, and 322 in FIG. 3A and FIG. 3B. The prioritization policy specifies that when updating dependencies of given libraries, processing a first given library at a leaf node or node further from a root node of the dependency version tree is given priority over processing a second given library at a root node or node closer to a root node of the dependency version tree.

In one embodiment, an employment of the prioritization policy is added to the process of FIGS. 3A-3B by including the following operations: (i) receiving multiple requests for upgrading respective libraries in the public library repository; (ii) determining respective nodes in the dependency version tree that are associated with the multiple requests; (iii) determining a sequence of the respective nodes based on distances between each of the respective nodes and a root node of the dependency version tree; (iv) determining a queue of the multiple requests according to the sequence based on the distances, so that a first request is positioned earlier in the queue than a second request, based on a first node associated with the first request being further from a root node in the dependency version tree than a second node associated with the second request; and (v) validating the respective libraries in an order specified by the queue, so that a validation of one library associated with one request in the queue of the multiple requests is completed before a beginning of a processing and a validation of a next library associated with a next request in the queue of the multiple requests.

Figure 7:
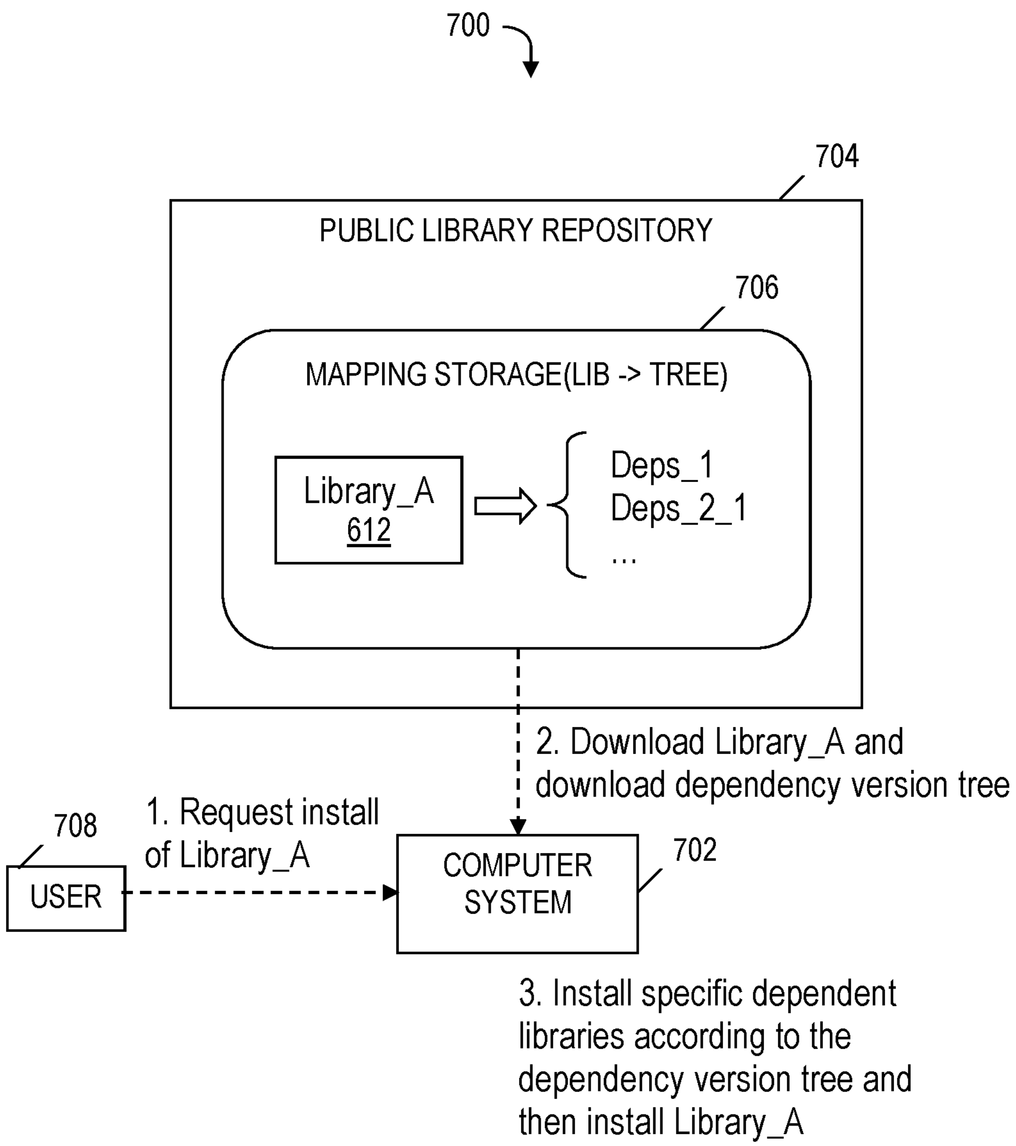
FIG. 7 is an example of installing a library and library dependencies in the process of FIG. 3C, in accordance with embodiments of the present invention.

FIG. 7 is an example 700 of installing a library and library dependencies in the process of FIG. 3C, in accordance with embodiments of the present invention. Example 700 includes a local computer system 702, a public library repository 704, a mapping storage 706, and a user 708 that utilizes computer system 702. Public library repository 704 is an example of public library repository 404 and mapping storage 706 is an example of mapping storage 406. Example 700 includes a step 1 that includes user 708 using computer system 702 to request an installation of Library_A locally at computer system 702. Step 1 is an example of an action included in step 352 in FIG. 3C.

Example 700 further includes a step 2 that includes computer system 702 downloading Library_A and downloading the dependency version tree from public library repository 704. Step 2 is an example of an action included in step 354 in FIG. 3C.

Example 700 further includes a step 3 that includes computer system 702 installing specific dependent libraries (i.e., libraries on which Library_A depends) according to the dependency version tree, and then installing Library_A. Step 3 is an example of an action included in step 356 in FIG. 3C. Although not shown in FIG. 7, following step 3, user 708 uses the newly installed Library_A via computer 702 as part of a software development activity. Based on the utilization of the dependency version tree, user 708 ensures that there are no conflicts between dependencies of Library_A during the installation of Library_A in step 3 and while using Library_A. The use of the installed Library_A is an example of an action included in step 358 in FIG. 3C.

The library development technique disclosed herein allows users to specify a library version selection policy. In one embodiment, the library version selection policy includes the options "latest version compatible," "oldest version compatible," "median version compatible," and "random version compatible." These options correspond to selecting the latest compatible version of the library, the oldest compatible version of the library, a version in the middle range of compatibility, and a randomly selected compatible version of the library, respectively. After the specification of the library version selection policy, computer system 702 uses the user-specified library version selection policy to determine and provide an available dependency version tree. Because the library version selection policy is applied automatically via the dependency version tree and because the download of the dependency version tree is not visible to users, users do not need to consider the issue of multiple versions being available for a given library (i.e., a user does not need to use conventional techniques that include the user considering documentation of the ranges of versions of libraries).

The descriptions of the various embodiments of the present invention have been presented herein for purposes of illustration but are not intended to be exhaustive or limited to the embodiments disclosed. Many modifications and variations will be apparent to those or ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, requests to publish multiple libraries to a public library repository, wherein each request of the requests includes a respective library of the multiple libraries, a respective specification of specifications of the multiple libraries, and a respective validation script of validation scripts of the multiple libraries, the respective specification is a declaration of one or more dependencies of the respective library, and the respective specification indicates a range of versions for each of the one or more dependencies of the respective library;

building, by the processor set, a dependency version tree that includes the specifications of the multiple libraries;

receiving, by the processor set, a request to upload a new version of a first library to the public library repository, the first library being included in the multiple libraries;

detecting, by the processor set, a trigger based on the receiving of the request to upload the new version of the first library;

invoking, by the processor set, based on the trigger, a set of validation scripts of the validation scripts, wherein each validation script of the set of validation scripts is associated with a respective library of one or more libraries that are dependent upon the first library, and the one or more libraries dependent upon the first library are included in the multiple libraries;

validating, by the processor set, using the dependency version tree and the invoked set of validation scripts, a compatibility between the first library and the one or more libraries dependent upon the first library;

determining, by the processor set, based on the validating of the compatibility, that a second library of the one or more libraries is not compatible with the first library;

retaining, by the processor set, a range of versions of the second library based on the determining that the second library is not compatible with the first library; and installing, by the processor set, the second library having the retained range of versions.

2. The computer-implemented method of claim 1, wherein the validating includes:

identifying, by the processor set, the one or more libraries dependent upon the first library based on the dependency version tree.

3. The computer-implemented method of claim 1, further comprising:

receiving, by the processor set, a request to install the second library, the second library being dependent upon the first library;

downloading, by the processor set, the second library and the dependency version tree comprising the retained range of versions of the second library;

installing, by the processor set, based on the downloaded dependency version tree, the first library on which the second library;

installing, by the processor set, the second library based on the installing of the first library; and using, by the processor set, the installed second library with an assurance of a compatibility between the second library and the first library and with a minimized likelihood of a conflict between the second library and the first library.

4. The computer-implemented method of claim 1, further comprising:

determining, by the processor set, based on the validating of the compatibility between the first library and the one or more libraries dependent upon the first library, that a third library of the one or more libraries is compatible with the first library; and updating, by the processor set, based on the determining that the third library is compatible with the first library, the dependency version tree to include the new version of the first library in an extended range of versions to which the third library is mapped.

5. The computer-implemented method of claim 4, further comprising:

recursively validating, by the processor set, a compatibility of the third library with one or more libraries dependent upon the third library, wherein the recursively validating includes traversing a path in the dependency version tree by moving from a node of the dependency version tree indicating the third library to a root node of the dependency version tree, and the one or more libraries dependent upon the third library are included in the multiple libraries.

6. The computer-implemented method of claim 1, further comprising:

receiving, by the processor set, based on the request to upload the new version of the first library, an upload of the new version of the first library to the public library repository.

7. The computer-implemented method of claim 1, further comprising:

receiving, by the processor set, multiple requests for upgrading respective libraries of the multiple libraries in the public library repository;

determining, by the processor set, respective nodes in the dependency version tree that are associated with the multiple requests;

determining, by the processor set, a sequence of the respective nodes based on distances between each of the respective nodes and a root node of the dependency version tree;

determining, by the processor set, a queue of the multiple requests according to the sequence based on the distances; and validating, by the processor set, the respective libraries in an order specified by the queue, so that a validation of a library associated with a respective request in the queue of the multiple requests is completed before a beginning of a processing and a validation of a next library associated with a next request in the queue of the multiple requests.

8. A computer system, comprising:

a processor set;

a set of one or more computer-readable storage media; and program instructions, collectively stored in the set of one or more computer-readable storage media, for causing the processor set to perform computer operations comprising:

receiving requests to publish multiple libraries to a public library repository, wherein each request of the requests includes a respective library of the multiple libraries, a respective specification of specifications of the multiple libraries, and a respective validation script of validation scripts of the multiple libraries, the respective specification is a declaration of one or more dependencies of the respective library, and the respective specification indicates a range of versions for each of the one or more dependencies of the respective library;

building a dependency version tree that includes the specifications of the multiple libraries;

receiving a request to upload a new version of a first library to the public library repository, the first library being included in the multiple libraries;

detecting a trigger based on the receiving of the request to upload the new version of the first library;

invoking, based on the trigger, a set of validation scripts of the validation scripts, wherein each validation script of the set of validation scripts is associated with a respective library of one or more libraries that are dependent upon the first library, and the one or more libraries dependent on the first library are included in the multiple libraries;

validating, by using the dependency version tree and the invoked set of validation scripts, a compatibility between the first library and the one or more libraries dependent upon the first library;

determining, based on the validating of the compatibility, that a second library of the one or more libraries is not compatible with the first library;

retaining a range of versions of the second library based on the determining that the second library is not compatible with the first library; and installing the second library having the retained range of versions.

9. The computer system of claim 8, wherein the validating includes:

identifying the one or more libraries dependent upon the first library based on the dependency version tree.

10. The computer system of claim 8, wherein the computer operations further comprise:

receiving a request to install the second library, the second library being dependent upon the first library;

downloading the second library and the dependency version tree comprising the retained range of versions of the second library;

installing, based on the downloaded dependency version tree, the first library on which the second library is dependent;

installing the second library based on the installing of the first library; and using the installed second library with an assurance of a compatibility between the second library and the first library and with a minimized likelihood of a conflict between the second library and the first library.

11. The computer system of claim 8, wherein the computer operations further comprise:

determining, based on the validating of the compatibility between the first library and the one or more libraries dependent upon the first library, that a third library of the one or more libraries is compatible with the first library; and updating, based on the determining that the third library is compatible with the first library, the dependency version tree to include the new version of the first library in an extended range of versions to which the third library is mapped.

12. The computer system of claim 11, wherein the computer operations further comprise:

recursively validating, a compatibility of the third library with one or more libraries dependent upon the third library, wherein the recursively validating includes traversing a path in the dependency version tree by moving from a node of the dependency version tree indicating the third library to a root node of the dependency version tree, and the one or more libraries dependent upon the third library are included in the multiple libraries.

13. The computer system of claim 8, wherein the computer operations further comprise:

receiving, based on the request to upload the new version of the first library, an upload of the new version of the first library to the public library repository.

14. The computer system of claim 8, wherein the computer operations further comprise:

receiving multiple requests for upgrading respective libraries of the multiple libraries in the public library repository;

determining respective nodes in the dependency version tree that are associated with the multiple requests;

determining a sequence of the respective nodes based on distances between each of the respective nodes and a root node of the dependency version tree;

determining a queue of the multiple requests according to the sequence based on the distances; and validating the respective libraries in an order specified by the queue, so that a validation of a library associated with a respective request in the queue of the multiple requests is completed before a beginning of a processing and a validation of a next library associated with a next request in the queue of the multiple requests.

15. A computer program product comprising:

a set of one or more computer-readable storage media; and program instructions, collectively stored in the set of one or more computer-readable storage media, for causing a processor set to perform computer operations comprising:

receiving requests to publish multiple libraries to a public library repository, wherein each request of the requests includes a respective library of the multiple libraries, a respective specification of specifications of the multiple libraries, and a respective validation script of validation scripts of the multiple libraries, the respective specification is a declaration of one or more dependencies of the respective library, and the respective specification indicates a range of versions for each of the one or more dependencies of the respective library;

building a dependency version tree that includes the specifications of the multiple libraries;

receiving a request to upload a new version of a first library to the public library repository, the first library being included in the multiple libraries;

detecting a trigger based on the receiving of the request to upload the new version of the first library;

invoking, based on the trigger, a set of validation scripts of the validation scripts, wherein each validation script of the set of validation scripts is associated with a respective library of one or more libraries that are dependent upon the first library, and the one or more libraries dependent on the first library are included in the multiple libraries;

validating, by using the dependency version tree and the invoked set of validation scripts, a compatibility between the first library and the one or more libraries dependent upon the first library;

determining, based on the validating of the compatibility, that a second library of the one or more libraries is not compatible with the first library;

retaining a range of versions of the second library based on the determining that the second library is not compatible with the first library; and installing the second library having the retained range of versions.

16. The computer program product of claim 15, wherein the validating includes:

identifying the one or more libraries dependent upon the first library based on the dependency version tree.

17. The computer program product of claim 15, wherein the computer operations further comprise:

receiving a request to install the second library, the second library being dependent upon the first library;

downloading the second library and the dependency version tree comprising the retained range of versions of the second library;

installing, based on the downloaded dependency version tree, the first library on which the second library is dependent;

installing the second library based on the installing of the first library; and using the installed second library with an assurance of a compatibility between the second library and the first library and with a minimized likelihood of a conflict between the second library and the first library.

18. The computer program product of claim 15, wherein computer operations further comprise:

determining, based on the validating of the compatibility between the first library and the one or more libraries dependent upon the first library, that a third library of the one or more libraries is compatible with the first library; and updating, based on the determining that the third library is compatible with the first library, the dependency version tree to include the new version of the first library in an extended range of versions to which the third library is mapped.

19. The computer program product of claim 18, wherein the computer operations further comprise:

recursively validating a compatibility of the third library with one or more libraries dependent upon the third library, wherein the recursively validating includes traversing a path in the dependency version tree by moving from a node of the dependency version tree indicating the third library to a root node of the dependency version tree, and the one or more libraries dependent upon the third library are included in the multiple libraries.

20. The computer program product of claim 15, wherein the computer operations further comprise:

receiving, based on the request to upload the new version of the first library, an upload of the new version of the first library to the public library repository.

* * * * *